(12) United States Patent
Gill

(10) Patent No.: US 9,874,374 B1
(45) Date of Patent: Jan. 23, 2018

(54) APPLIANCE DRAIN PAN WITH REMOVEABLY ATTACHABLE SIDE

(71) Applicant: KMG Products, LLC, Turlock, CA (US)

(72) Inventor: Kevin M. Gill, Linden, CA (US)

(*) Notice: Subject to any disclaimer, the term of this patent is extended or adjusted under 35 U.S.C. 154(b) by 0 days.

(21) Appl. No.: 15/379,847

(22) Filed: Dec. 15, 2016

(51) Int. Cl.
*F24H 9/16* (2006.01)
*F16N 31/00* (2006.01)

(52) U.S. Cl.
CPC .......... *F24H 9/165* (2013.01); *F16N 31/002* (2013.01)

(58) Field of Classification Search
CPC ...... F24H 9/165; F16N 31/002; F16N 31/004; F16N 31/006; B65D 7/12; B65D 7/36; B65D 7/34; B65D 90/02; B65D 90/24; B65D 11/1866
USPC .... 220/571, 4.28, 4.32, 4.31, 682, 677, 690, 220/684, 617, 615, 610, 621, 620, 618, 220/689; 184/106; 72/379.4; 229/122.29, 122.27
See application file for complete search history.

(56) References Cited

U.S. PATENT DOCUMENTS

| 105,152 | A | * | 7/1870 | Webster | B65D 7/36 220/620 |
| 3,456,832 | A | * | 7/1969 | Ihlenfeld | A24F 19/06 131/242 |
| 5,168,959 | A | * | 12/1992 | Davis | F16N 31/002 141/106 |
| 5,452,739 | A | * | 9/1995 | Mustee | A47L 15/4212 137/312 |

FOREIGN PATENT DOCUMENTS

FR 2302254 A1 * 9/1976 ............. B65D 77/20

* cited by examiner

*Primary Examiner* — Robert J Hicks
(74) *Attorney, Agent, or Firm* — Craig A. Simmermon

(57) ABSTRACT

Appliance drain pan with removeably attachable side comprises: a bottom member, a first side member, a second side member, a third side member, and a removeably attachable side member. Removeably attachable side member is impervious to liquids or fluids or is liquid-tight when attached to appliance drain pan with removeably attachable side. Removeably attachable side member comprises: a bottom tongue member, a right tongue member, or a left tongue member, along with, a bottom groove member, a left groove member, or a right groove member.

3 Claims, 8 Drawing Sheets

APPLIANCE DRAIN PAN WITH REMOVEABLY ATTACHABLE SIDE

BACKGROUND OF THE INVENTION

1. Field of the Invention

This invention pertains to a drain pan or drainage pan for an appliance such as a water heater, water tank, clothes washer, sink, fuel tank or other appliance and specifically to a drain pan or drainage pan with a removeably attachable side with a means of removable attachment that is impervious to liquids or fluids when attached to the drain pan or drainage pan.

2. Description of Related Art

Many building codes require the installation of a drain pan or drainage pan underneath many appliances such as: a water heater, water tank, clothes washer, sink, fuel tank, or other appliance for heath and safety purposes. Drain pans or drainage pans allow any leaking fluids or liquids from the appliance to be collected or pooled in the drain pan or drainage pan without the leaking fluids or liquids draining into the floor structure of the house or building thereby preventing water damage to the house or building. The holding capacity of many drain pans or drainage pans must be sufficient to contain a large quantity of leaking fluid or liquid from the appliance, hence the sides of many drain pan or drainage pan must be relatively tall to provide such large holding capacity.

There are many drain pans or drainage pans for appliances in the prior art, but none have a removeably attachable side with a means of removable attachment that is impervious to liquids or fluids when attached to the drain pan or drainage pan. Aspects of this invention allow for a removeably attachable side to be easily removed from the drain pan or drainage pan in order to allow for faster and easier installation of a heavy appliance where the heavy appliance can be be slid into place, without the need to lift the heavy appliance over a side of the drain pan or drainage pan. After the heavy appliance is installed, the removeably attachable side is then easily reinstalled onto the drain pan or drainage pan to yield a liquid tight seal with the drain pan or drainage pan.

BRIEF SUMMARY OF THE INVENTION

It is an aspect of appliance drain pan with removeably attachable side to include: a bottom member, a first side member, a second side member, a third side member, and a removeably attachable side member.

It is an aspect of appliance drain pan with removeably attachable side to include a means to removeably attach removeably attachable side member to appliance drain pan with removeably attachable side.

The means to removeably attach removeably attachable side member is impervious to fluids or liquids when removeably attachable side member is attached to appliance drain pan with removeably attachable side.

The means to removeably attach removeably attachable side member is liquid-tight when removeably attachable side member is attached to appliance drain pan with removeably attachable side.

It is an aspect of removeably attachable side member to include one or more tongue members that removeably attach or connect with groove members on the appliance drain pan with removeably attachable side.

For easier installation of an appliance, the removeably attachable side member is first removed from the drain pan, the appliance is then lid into place on top of the drain pan, finally the removeably attachable side member is reinstalled onto the drain pan to meet the building code requirements.

Appliances can be installed without the need to lift the appliance over a side of the drain pan.

DEFINITION LIST

Figure 1:
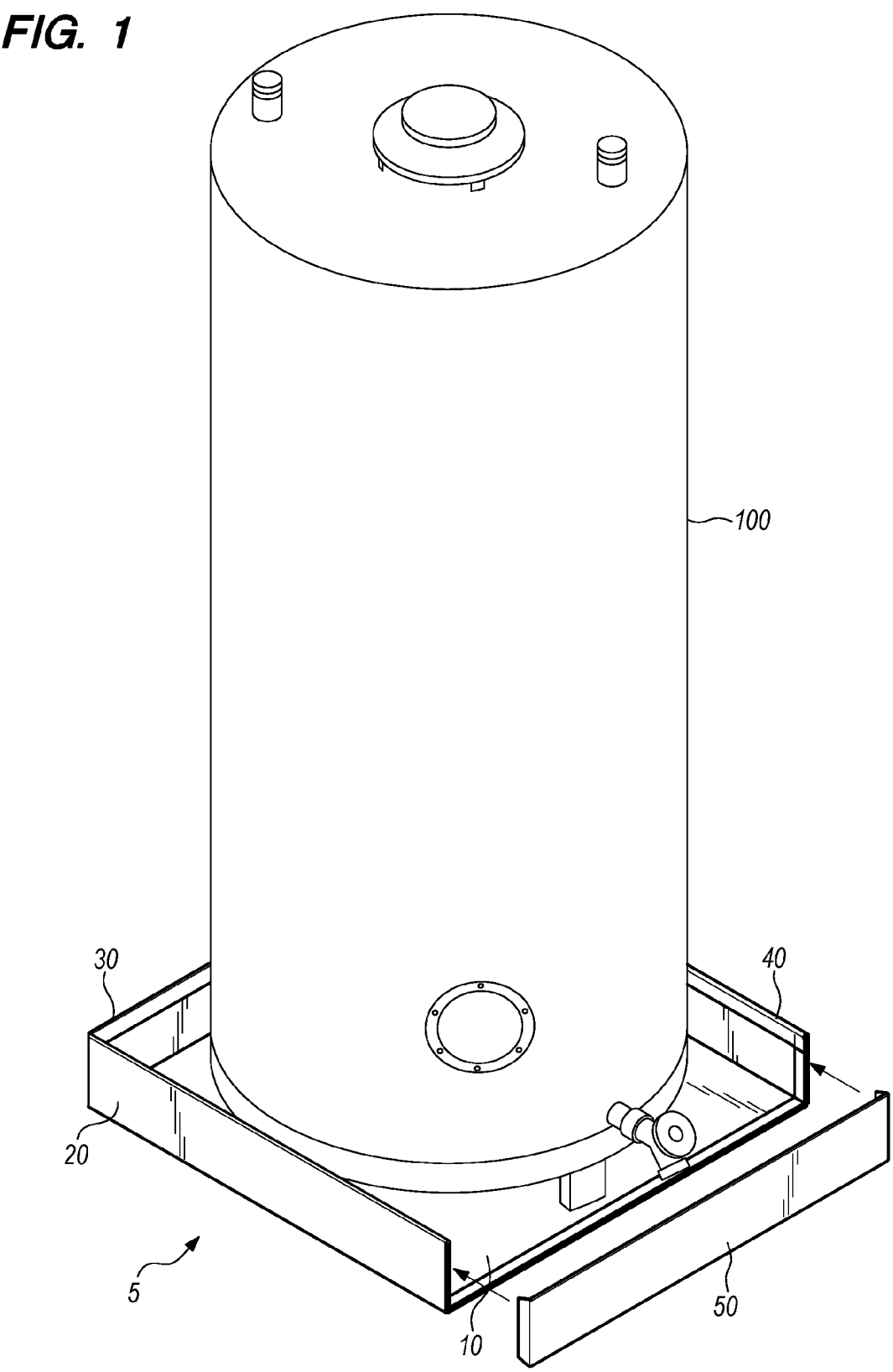
FIG. 1 is a top perspective view of appliance drain pan with removeably attachable side with an appliance placed therein and the removeably attachable side removed and separated therefrom.

| Term | Definition |
|---|---|
| 5 | Appliance Drain Pan with Removeably Attachable Side |
| 10 | Bottom Member |
| 11 | Front End of Bottom Side Member |
| 12 | Rear End of Bottom Side Member |
| 13 | Right End of Bottom Side Member |
| 14 | Left End of Bottom Side Member |
| 17 | Bottom Groove Member |
| 18 | Upper Looped Seam of Bottom Groove Member |
| 19 | Lower Looped Seam of Bottom Groove Member |
| 20 | First Side Member |
| 21 | Top End of First Side Member |
| 22 | Bottom End of First Side Member |
| 23 | Front End of First Side Member |
| 24 | Rear End of First Side Member |
| 27 | Left Groove Member |
| 28 | Inner Looped Seam of Left Groove Member |
| 29 | Outer Looped Seam of Left Groove Member |
| 30 | Second Side Member |
| 31 | Top End of Second Side Member |
| 32 | Bottom End of Second Side Member |
| 33 | Right End of Second Side Member |
| 34 | Left End of Second Side Member |

DEFINITION LIST

| Term | Definition |
| --- | --- |
| 40 | Third Side Member |
| 41 | Top End of Third Side Member |
| 42 | Bottom End of Third Side Member |
| 43 | Front End of Third Side Member |
| 44 | Rear End of Third Side Member |
| 47 | Right Groove Member |
| 48 | Inner Looped Seam of Right Groove Member |
| 49 | Outer Looped Seam of Right Groove Member |
| 50 | Removeably Attachable Side Member |
| 51 | Top End of Removeably Attachable Side Member |
| 52 | Bottom End of Removeably Attachable Side Member |
| 53 | Right End of Removeably Attachable Side Member |
| 54 | Left End of Removeably Attachable Side Member |
| 57 | Bottom Tongue Member |
| 58 | Right Tongue Member |
| 59 | Left Tongue Member |
| 100 | Appliance |

DETAILED DESCRIPTION OF THE INVENTION

Appliance drain pan with removeably attachable side 5 comprises: a bottom member 10, a first side member 20, a second side member 30, a third side member 40, and a removeably attachable side member 50.

Bottom member 10 is a rigid quadrilateral planar member that is positioned horizontally. Bottom member 10 may be square-shaped or rectangular-shaped. Bottom member 10 is impervious to liquids or fluids. Bottom member 10 has an upper surface and a bottom surface. Bottom member 10 has a front end 11, a rear end 12, a right end 13, and a left end 14. Alternately, bottom member 10 may include a drain or drainage hole therein. Drain or drainage hole (not depicted) functions as a drain for any liquid or fluid that may pool in appliance drain pan with removeably attachable side 5 as a result of a leak of liquid or fluid from the appliance 100. Drain or drainage hole is typically connected to a drainage system of pipes or tubes (not depicted) to allow the pooled liquid or fluid to drain away from the appliance 100 and appliance drain pan with removeably attachable side 5.

First side member 20 is a rigid quadrilateral planar member that is positioned vertically and parallel to third side member 40. First side member 20 may be square-shaped or rectangular-shaped. First side member 20 is impervious to liquids or fluids. First side member 20 has an inside surface and an outside surface. First side member 20 has a top end 21, a bottom end 22, a front end 23, and a rear end 24.

Second side member 30 is a rigid quadrilateral planar member that is positioned vertically. Second side member 30 is parallel with removeably attachable side member 50 when removeably attachable side member 50 is attached to appliance drain pan with removeably attachable side 5. Second side member 30 may be square-shaped or rectangular-shaped. Second side member 30 is impervious to liquids or fluids. Second side member 30 has an inside surface and an outside surface. Second side member 30 has a top end 31, a bottom end 32, a right end 33, and a left end 34.

Third side member 40 is a rigid quadrilateral planar member that is positioned vertically and parallel with first side member 20. Third side member 40 may be square-shaped or rectangular-shaped. Third side member is impervious to liquids or fluids. Third side member 40 has an inside surface and an outside surface. Third side member 40 has a top end 41, a bottom end 42, a front end 43, and a rear end 44.

The bottom end 22 of first side member 20 is rigidly attached to the left end 14 of bottom member 10 with first side member 20 positioned perpendicular to bottom member 10. Rigid attachment is impervious to liquids or fluids. Rigid attachment may be accomplished by any known means. Rigid attachment may be accomplished by weld, solder, glue, adhesive, epoxy, caulk, putty, or other means. Rigid attachment may be accomplished folding the left end 14 of bottom member 10 into the bottom end 22 of first side member 20 and pressing the two members together to form a pressed seam lock or Pittsburgh seam lock. Rigid attachment may be accomplished folding the bottom end 22 of first side member 20 into the left end 14 of bottom member 10 and pressing the two members together to form a pressed seam lock or Pittsburgh seam lock. In best mode, rigid attachment is accomplished by folding or bending a tab on the left end 14 of bottom member 10 ninety degrees to form first side member 20, where the tab itself is the first side member 20.

The bottom end 32 of second side member 30 is rigidly attached to the rear end 12 of bottom member 10 with second side member 30 positioned perpendicular to bottom member 10. Rigid attachment is impervious to liquids or fluids. Rigid attachment may be accomplished by any known means. Rigid attachment may be accomplished by weld, solder, glue, adhesive, epoxy, caulk, putty, or other means. Rigid attachment may be accomplished folding the rear end 12 of bottom member 10 into the bottom end 32 of second side member 30 and pressing the two members together to form a pressed seam lock or Pittsburgh seam lock. Rigid attachment may be accomplished folding the bottom end 32 of second side member 30 into the rear end 12 of bottom member 10 into and pressing the two members together to form a pressed seam lock or Pittsburgh seam lock. In best mode, rigid attachment is accomplished by folding or bending a tab on the rear end 12 of bottom member 10 ninety degrees to form second side member 30, where the tab itself is the second side member 30.

The bottom end 42 of third side member 40 is rigidly attached to the right end 13 of bottom member 10 with third side member 40 positioned perpendicular to bottom member 10. Rigid attachment is impervious to liquids or fluids. Rigid attachment may be accomplished by any known means. Rigid attachment may be accomplished by weld, solder, glue, adhesive, epoxy, caulk, putty, or other means. Rigid attachment may be accomplished folding the right end 13 of bottom member 10 into the bottom end 42 of third side member 40 and pressing the two members together to form a pressed seam lock or Pittsburgh seam lock. Rigid attachment may be accomplished folding the bottom end 42 of third side member 40 into the right end 13 of bottom member 10 and pressing the two members together to form a pressed seam lock or Pittsburgh seam lock. In best mode, rigid attachment is accomplished by folding or bending a tab on the right end 13 of bottom member 10 ninety degrees to form the third side member 40, where the tab itself is the third side member 40.

First side member 20 is positioned perpendicular to second side member 30. The rear end 24 of first side member 20 is rigidly attached to the left end 34 of second side member 30. Rigid attachment is impervious to liquids or fluids. Rigid attachment may be accomplished by any known means. Rigid attachment may be accomplished by weld, solder, glue, adhesive, epoxy, caulk, putty, or other means. Rigid attachment may be accomplished folding the left end 34 of second side member 30 into the rear end 24 of first side member 20 and pressing the two members together to form a pressed seam lock or Pittsburgh seam lock. Rigid attachment may be accomplished folding the rear end 24 of first side member 20 into the left end 34 of second side member 30 and pressing the two members together to form a pressed seam lock or Pittsburgh seam lock. In best mode, rigid attachment is accomplished by folding or bending a tab on the rear end 24 of first side member 20 ninety degrees to press against the left end 34 of second side member 30 or a tab on the left end 34 of second side member 30 ninety degrees to press against the rear end 24 of first side member 20 to form a pressed seam lock or Pittsburgh seam lock.

Third side member 40 is positioned perpendicular to second side member 30. The rear end 44 of third side member 40 is rigidly attached to the right end 33 of second side member 30. Rigid attachment is impervious to liquids or fluids. Rigid attachment may be accomplished by any known means. Rigid attachment may be accomplished by weld, solder, glue, adhesive, epoxy, caulk, putty, or other means. Rigid attachment may be accomplished folding the right end 33 of second side member 30 into the rear end 44 of third side member 40 and pressing the two members together to form a pressed seam lock or Pittsburgh seam lock. Rigid attachment may be accomplished folding the rear end 44 of third side member 40 into the right end 33 of second side member 30 and pressing the two members together to form a pressed seam lock or Pittsburgh seam lock. In best mode, rigid attachment is accomplished by folding or bending a tab on the rear end 44 of third side member 40 ninety degrees to press against the right end 33 of second side member 30 or a tab on the right end 33 of second side member 30 ninety degrees to press against the rear end 44 of third side member 40 to form a pressed seam lock or Pittsburgh seam lock.

Removeably attachable side member 50 is a rigid quadrilateral planar member that is positioned vertically and parallel to second side member 30 when removeably attachable side member 50 is attached to appliance drain pan with removeably attachable side 5. Removeably attachable side member 50 may be square-shaped or rectangular-shaped. Removeably attachable side member 50 is impervious to liquids or fluids. Removeably attachable side member 50 has an inside surface and an outside surface. Removeably attachable side member 50 has a top end 51, a bottom end 52, a right end 53, and a left end 54.

Appliance drain pan with removeably attachable side 5 further comprises: a means to removeably attach removeably attachable side member 50 to appliance drain pan with removeably attachable side 5, wherein the means to removeably attach removeably attachable side member 50 to appliance drain pan with removeably attachable side 5 is impervious to liquids or fluids when the removeably attachable side member 50 is attached to appliance drain pan with removeably attachable side 5. Appliance drain pan with removeably attachable side 5 further comprises: a means to removeably attach removeably attachable side member 50 to appliance drain pan with removeably attachable side 5, wherein the means to removeably attach removeably attachable side member 50 to appliance drain pan with removeably attachable side 5 is liquid-tight when the removeably attachable side member 50 is attached to appliance drain pan with removeably attachable side 5. The means to removeably attach removeably attachable side member 50 to appliance drain pan with removeably attachable side 5 may be accomplished by any known means. Means to removeably attach removeably attachable side member 50 to appliance drain pan with removeably attachable side 5 may be accomplished by weld, solder, glue, adhesive, epoxy, caulk, putty, or other means.

The means to removeably attach removeably attachable side member 50 to appliance drain pan with removeably attachable side 5 may further comprise: a bottom tongue member 57 on the bottom end 52 of removeably attachable side member 50 and a bottom groove member 17 on the front end 11 of bottom member 10, wherein tongue member 57 forms a removable press fit within groove member 17 to yield a means of removable attachment between these members that is impervious to liquids, is impervious to fluids, or is liquid-tight.

The means to removeably attach removeably attachable side member 50 to appliance drain pan with removeably attachable side 5 may further comprise: a right tongue member 58 on the right end 53 of removeably attachable side member 50 and right groove member 47 on the front end 43 of third side member 40, wherein tongue member 58 forms a removable press fit within groove member 47 to yield a means of removable attachment between these members that is impervious to liquids, is impervious to fluids, or is liquid-tight.

The means to removeably attach removeably attachable side member 50 to appliance drain pan with removeably attachable side 5 may further comprise: a left tongue member 59 on the left end 54 of removeably attachable side member 50 and a left groove member 27 on the front end 23 of first side member 20, wherein tongue member 59 forms a removable press fit within groove member 27 to yield a means of removable attachment between these members that is impervious to liquids, is impervious to fluids, or is liquid-tight.

The means to removeably attach removeably attachable side member 50 to appliance drain pan with removeably attachable side 5 may comprise: one or more of a bottom tongue member 57 on the bottom end 52 of removeably attachable side member 50, a right tongue member 58 on the right end 53 of removeably attachable side member 50, or a left tongue member 59 on the left end 54 of removeably attachable side member 50, along with, one or more of a bottom groove member 17 on the front end 11 of bottom member 10, a left groove member 27 on the front end 23 of first side member 20, or a right groove member 47 on the front end 43 of third side member 40, wherein one or more tongue members 57, 58, and 59 forms a removable press fit within one or more groove members 17, 47, and 27, respectively, to yield a means of removable attachment between these members that is impervious to liquids, impervious to fluids, or liquid-tight.

In best mode, the means to removeably attach removeably attachable side member 50 to appliance drain pan with removeably attachable side 5 comprises: a bottom tongue member 57 on the bottom end 52 of removeably attachable side member 50, a right tongue member 58 on the right end 53 of removeably attachable side member 50, and a left tongue member 59 on the left end 54 of removeably attachable side member 50, along with, a bottom groove member 17 on the front end 11 of bottom member 10, a left groove member 27 on the front end 23 of first side member 20, and a right groove member 47 on the front end 43 of third side member 40. Tongue members 57, 58, and 59 are sized and shaped to form a press fit within groove members 17, 47, and 27, respectively, or vice versa, so that there is enough pressure between tongue and groove members with tongue completely inserted into groove member to prevent the passing of liquid or fluid between these members, but not so much pressure to prevent tongue and groove members from being pulled apart by a person of average strength.

Bottom tongue member 57 is a rigid tab running along the entire bottom end 52 of removeably attachable side member 50. Bottom tongue member 57 is a rigid planar member positioned horizontally and perpendicular to the inside surface of removeably attachable side member 50 as depicted. Bottom tongue member 57 is about 0.05 to 0.5 inches thick and about 0.25 to 2 inches long. One end of bottom tongue member 57 is contiguous with the entire bottom end 52 of removeably attachable side member 50 to form a right angle or ninety degree connection between these members as depicted. In best mode, bottom tongue member 57 is a part of the same sheet of material as removeably attachable side member 50, where bottom tongue member 57 is an extended tab cut into the material beyond the boundaries of bottom end 52 that has been bent or folded ninety degrees to form bottom tongue member 57.

Right tongue member 58 is a rigid tab running along the entire right end 53 of removeably attachable side member 50. Right tongue member 58 is a rigid planar member positioned vertically and perpendicular to the inside surface of removeably attachable side member 50 as depicted. Right tongue member 58 is about 0.05 to 0.5 inches thick and about 0.25 to 2 inches long. One end of right tongue member 58 is contiguous with the right end 53 of removeably attachable side member 50 to form a right angle or ninety degree connection between these members as depicted. In best mode, right tongue member 58 is a part of the same sheet of material as removeably attachable side member 50, where right tongue member 58 is an extended tab cut into the material beyond the boundaries of right end 53 that has been bent or folded ninety degrees to form right tongue member 58.

Left tongue member 59 is a rigid tab running along the entire left end 54 of removeably attachable side member 50. Left tongue member 59 is a rigid planar member positioned vertically and perpendicular to the inside surface of removeably attachable side member 50 as depicted. Left tongue member 59 is about 0.05 to 0.5 inches thick and about 0.25 to 2 inches long. One end of left tongue member 59 is contiguous with the left end 54 of removeably attachable side member 50 to form a right angle or ninety degree connection between these members as depicted. In best mode, left tongue member 59 is a part of the same sheet of material as removeably attachable side member 50, where left tongue member 59 is an extended tab cut into the material beyond the boundaries of left end 54 that has been bent or folded ninety degrees to form left tongue member 59.

Bottom groove member 17 is a semi rigid seam running along the upper surface of the entire front end 11 of bottom member 10. Semi rigid seam is a planar member that is parallel with the plane of bottom member 10. Bottom groove member 17 comprises an upper looped seam 18 and a lower looped seam 19. Upper looped seam 18 is a rigid folded loop or seam of material running along the entire front end 11 of bottom member 10. Upper looped seam 18 has an upper layer of material connected by a fold or bend in the material to a lower layer of material. Upper and lower layers of material are parallel with each other. Upper and lower layers of material are coincident with and adjacent to each other. Lower looped seam 19 is a rigid folded loop or seam of material running along the entire front end 11 of bottom member 10. Lower looped seam 19 has an upper layer of material connected by a fold or bend in the material to a lower layer of material. Upper and lower layers of material are parallel with each other. Upper and lower layers of material are coincident with and adjacent to each other. The upper layer of material of upper looped seam 18 is connected to the upper layer of material of lower looped seam 19 by a fold or bend in the material, which is a single layer of material. This single layer of material is slightly flexible to yield a semi rigid hinge between the upper layer of material of upper looped seam 18 and the upper layer of material of lower looped seam 19, which slightly flexes when bottom tongue member 57 is inserted and/or removed therefrom. The distance between the lower layer of material of upper looped seam 18 and the upper layer of material of lower looped seam 19 is sized to make a removeable press fit with the thickness of bottom tongue member 57.

Right groove member 47 is a semi rigid seam running along the inner surface of the entire front end 43 of third side member 40. Semi rigid seam is a planar member that is parallel with the plane of third side member 40. Groove member 47 comprises an inner looped seam 48 and an outer looped seam 49. Inner looped seam 48 is a rigid folded loop or seam of material running along the entire front end 43 of third side member 40. Inner looped seam 48 has an inner layer of material connected by a fold or bend in the material to an outer layer of material. Inner and outer layers of material are parallel with each other. Inner and outer layers of material are coincident with and adjacent to each other. Outer looped seam 49 is a rigid folded loop or seam of material running along the entire front end 43 of third side member 40. Outer looped seam 49 has an inner layer of material connected by a fold or bend in the material to an outer layer of material. Inner and outer layers of material are parallel with each other. Inner and outer layers of material are coincident with and adjacent to each other. The inner layer of material of inner looped seam 48 is connected to the inner layer of material of outer looped seam 49 by a fold or bend in the material, which is a single layer of material. This single layer of material is slightly flexible to yield a semi rigid hinge between the inner layer of material of inner looped seam 48 and the inner layer of material of outer looped seam 49, which slightly flexes when right tongue member 58 is inserted and/or removed therefrom. The distance between the outer layer of material of inner looped seam 48 and the inner layer of material of outer looped seam 49 is sized to make a removeable press fit with the thickness of right tongue member 58. Upper looped seam 18 has a right end that is coincident with the right end 13 of bottom member 10. Upper looped seam 18 has a left end that is coincident with the left end 14 of bottom member 10. Inner looped seam 48 has an upper end that is coincident with top end 41 of third side member 40. Inner looped seam 48 has a lower end that is coincident with bottom end 42 of third side member 40. The right end of upper looped seam 18 is attached or connected to the lower end of inner looped seam 48 so that this attachment or connection is impervious to liquids or fluids or is liquid-tight, wherein this attachment may be accomplished by any known means. Rigid attachment may be accomplished by weld, solder, glue, adhesive, epoxy, caulk, putty, or other means. In best mode this attachment or connection is accomplished by pressing the two members together to form a liquid-tight seam there between.

Left groove member 27 is a semi rigid seam running along the inner surface of the entire front end 23 of first side member 20. Semi rigid seam is a planar member that is parallel with the plane of first side member 20. Left groove member 27 comprises an inner looped seam 28 and an outer looped seam 29. Inner looped seam 28 is a rigid folded loop or seam of material running along the entire front end 23 of first side member 20. Inner looped seam 28 has an inner layer of material connected by a fold or bend in the material to an outer layer of material. Inner and outer layers of material are parallel with each other. Inner and outer layers of material are coincident with and adjacent to each other. Outer looped seam 29 is a rigid folded loop or seam of material running along the entire front end 23 of first side member 20. Outer looped seam 29 has an inner layer of material connected by a fold or bend in the material to an outer layer of material. Inner and outer layers of material are parallel with each other. Inner and outer layers of material are coincident with and adjacent to each other. The inner layer of material of inner looped seam 28 is connected to the inner layer of material of outer looped seam 29 by a fold or bend in the material, which is a single layer of material. This single layer of material is slightly flexible to yield a semi rigid hinge between the inner layer of material of inner looped seam 28 and the inner layer of material of outer looped seam 29, which slightly flexes when left tongue member 59 is inserted and/or removed therefrom. The distance between the outer layer of material of inner looped seam 28 and the inner layer of material of outer looped seam 29 is sized to make a removeable press fit with the thickness of left tongue member 59. Inner looped seam 28 has an upper end that is coincident with top end 21 of first side member 20. Inner looped seam 28 has a lower end that is coincident with bottom end 22 of first side member 20. The left end of upper looped seam 18 is attached or connected to the lower end of inner looped seam 28 so that this attachment or connection is impervious to liquids or fluids or is liquid-tight, wherein this attachment may be accomplished by any known means. Rigid attachment may be accomplished by weld, solder, glue, adhesive, epoxy, caulk, putty, or other means. In best mode this attachment or connection is accomplished by pressing the two members together to form a liquid-tight seam there between.

Figure 2:
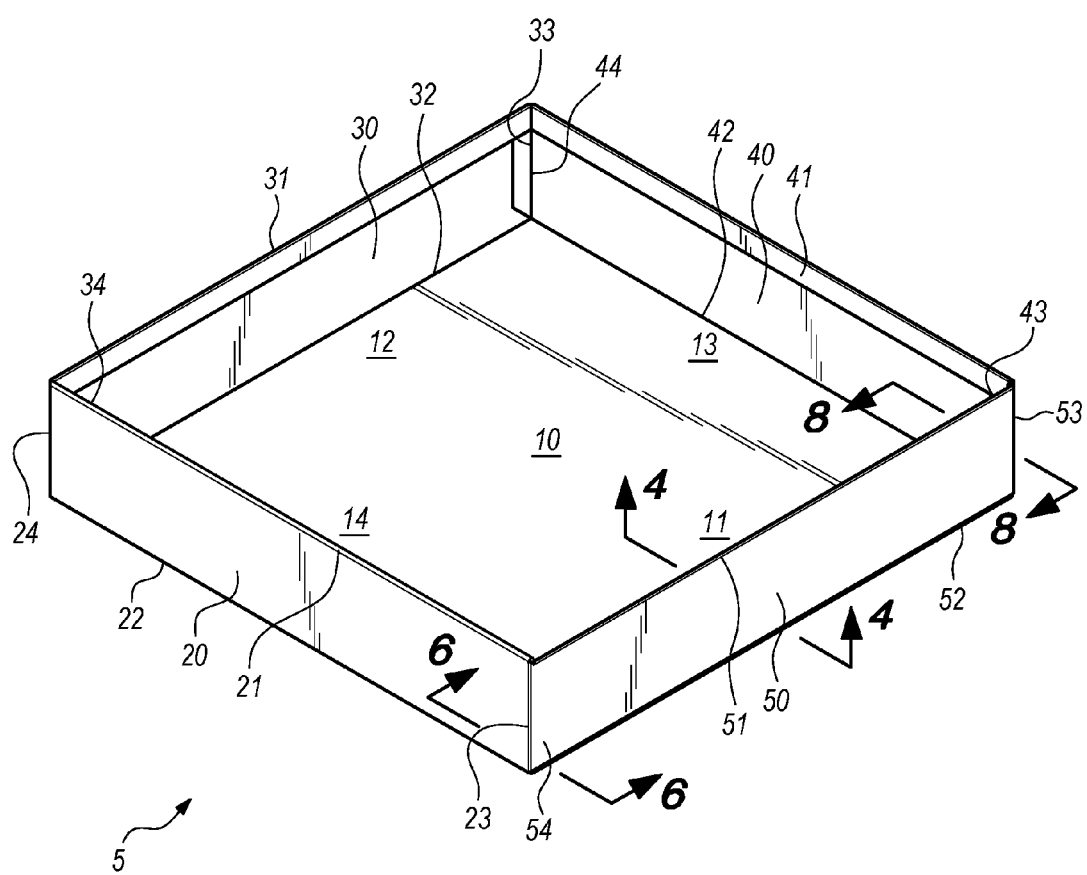
FIG. 2 is a top perspective view of appliance drain pan with removeably attachable side with the removeably attachable side attached thereto and defining cross-sectional planes 4, 6 and 8.
Figure 3:
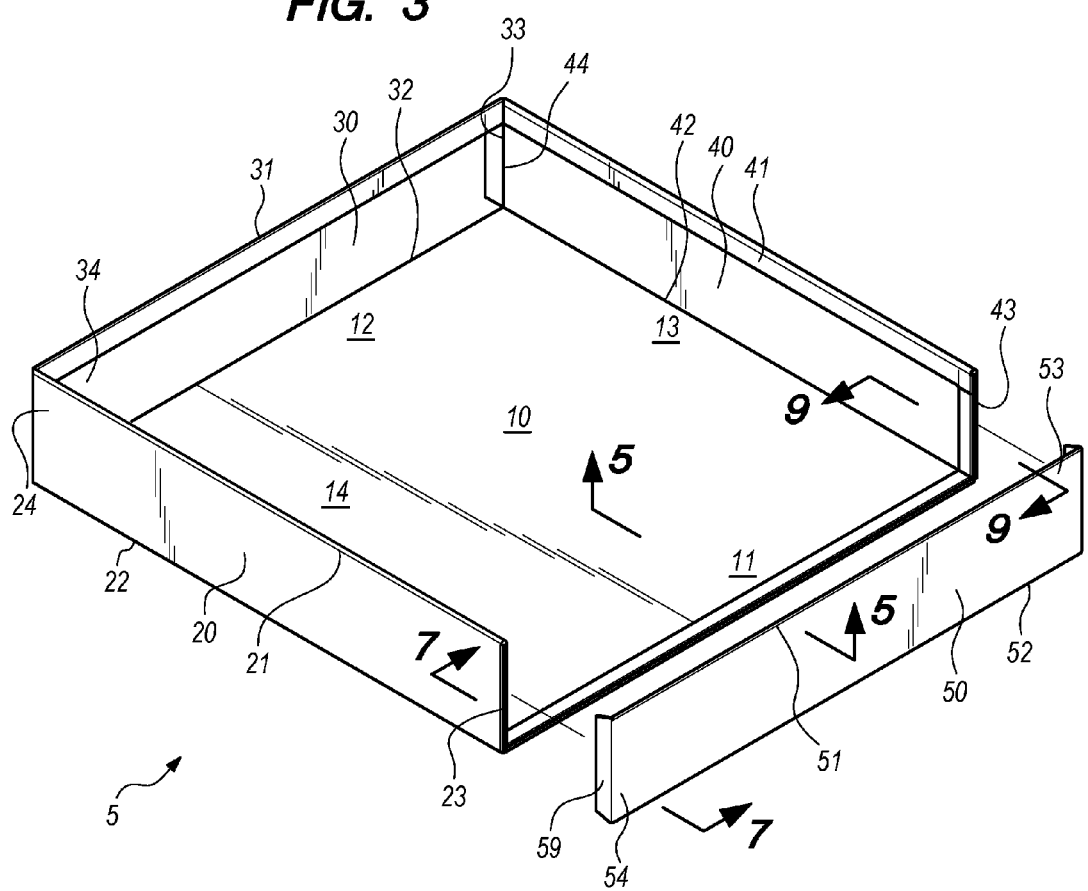
FIG. 3 is a top perspective view of appliance drain pan with removeably attachable side with the removeably attachable side removed and separated therefrom, defining cross-sectional planes 5, 7, and 9.
Figure 4:
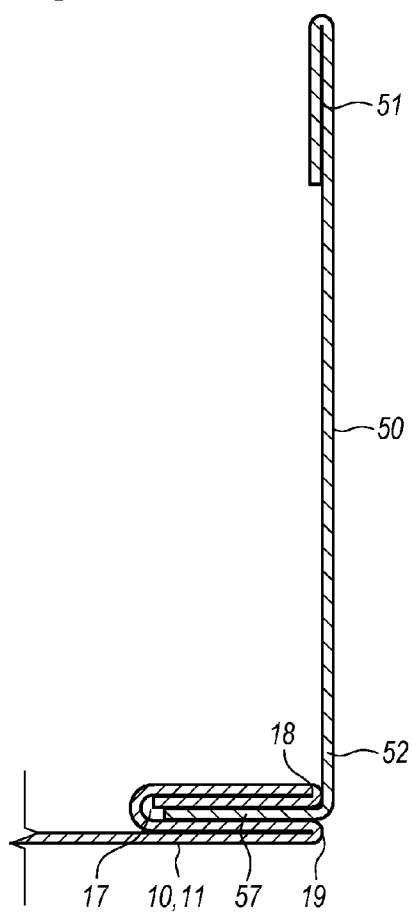
FIG. 4 is a depiction of cross-sectional plane 4, which is defined in FIG. 2.
Figure 5:
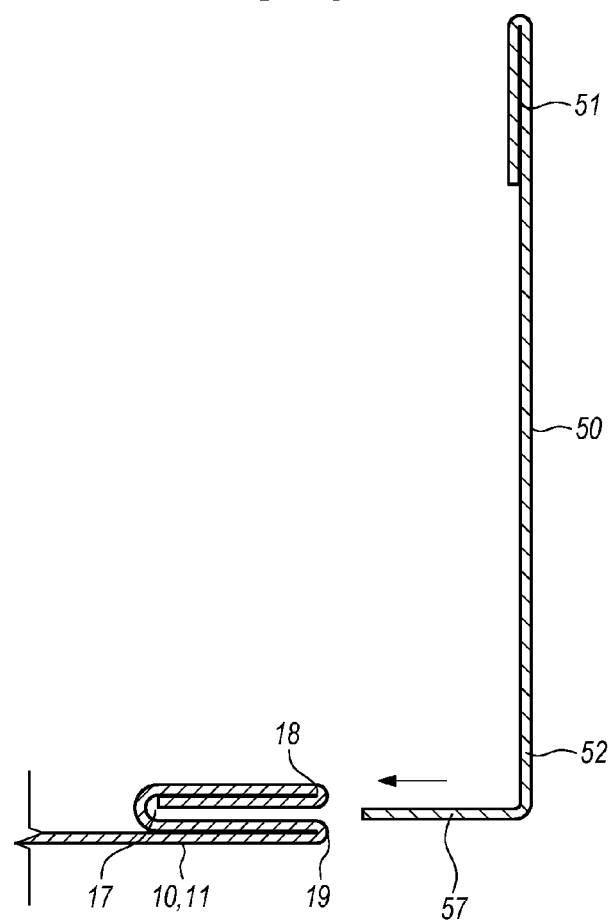
FIG. 5 is a depiction of cross-sectional plane 5, which is defined in FIG. 3.
Figure 6:
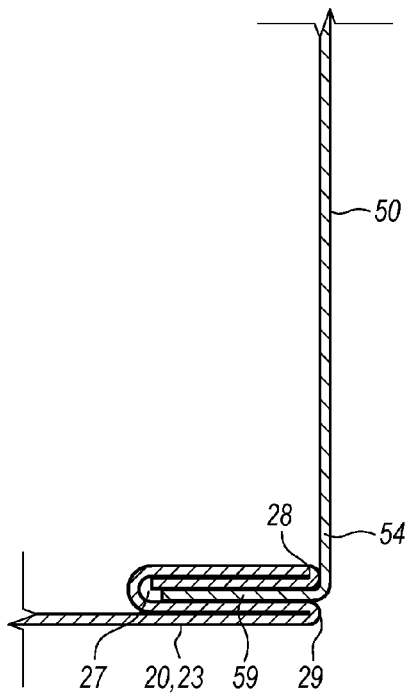
FIG. 6 is a depiction of cross-sectional plane 6, which is defined in FIG. 2.
Figure 7:
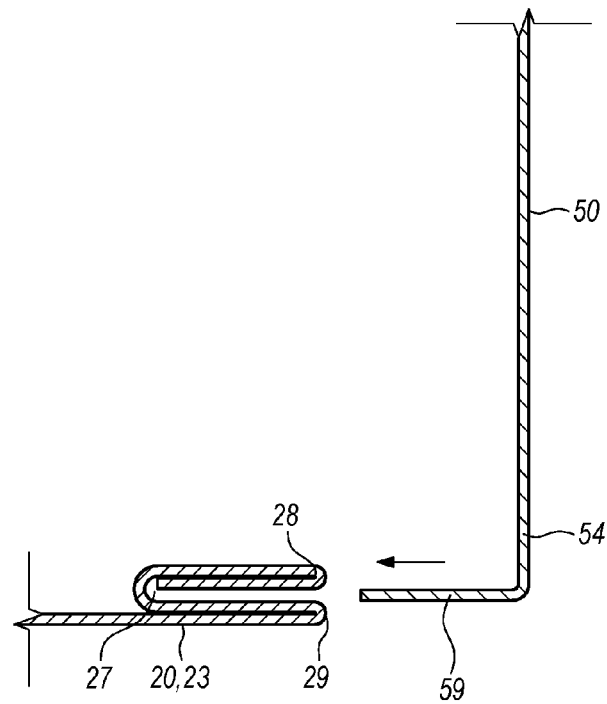
FIG. 7 is a depiction of cross-sectional plane 7, which is defined in FIG. 3.
Figure 8:
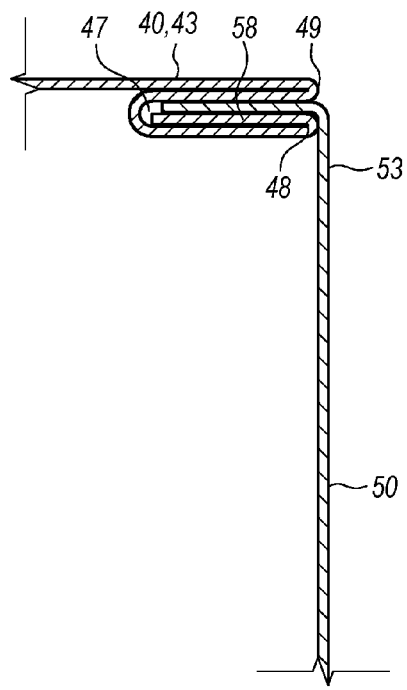
FIG. 8 is a depiction of cross-sectional plane 8, which is defined in FIG. 2.
Figure 9:
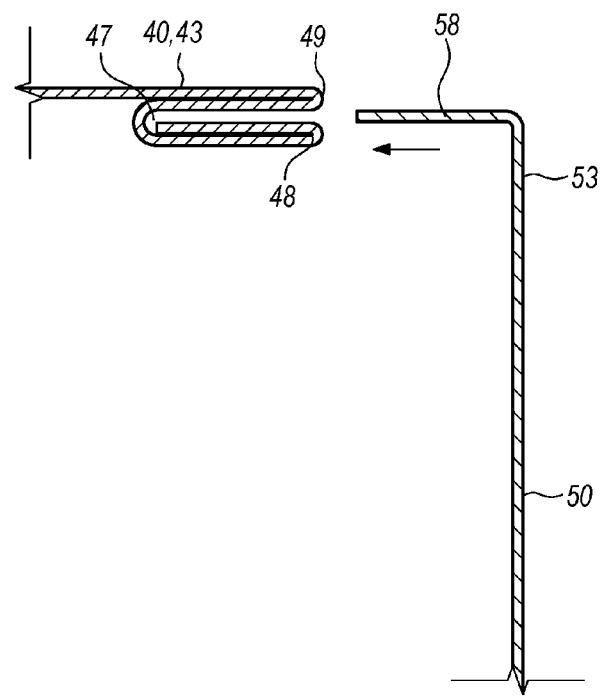
FIG. 9 is a depiction of cross-sectional plane 9, which is defined in FIG. 3.
Figure 10:
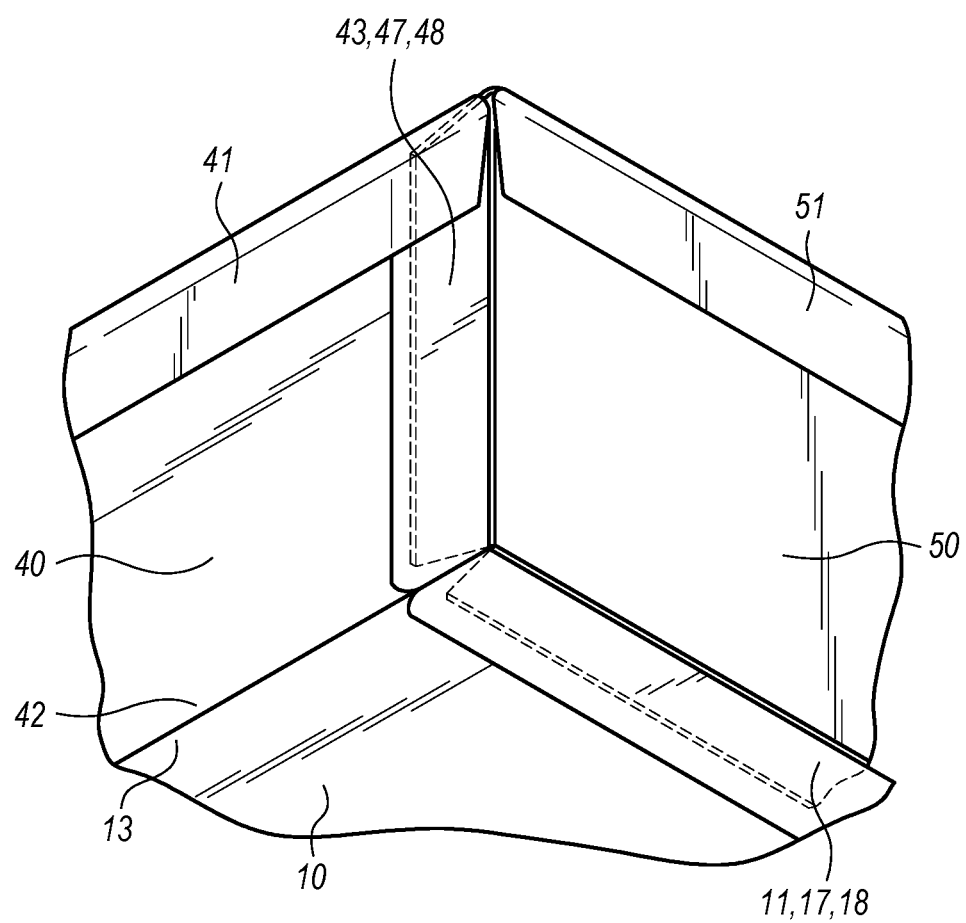
FIG. 10 is an enlarged view of the inside front right corner of appliance drain pan with removeably attachable side with the removeably attachable side attached thereto.
Figure 11:
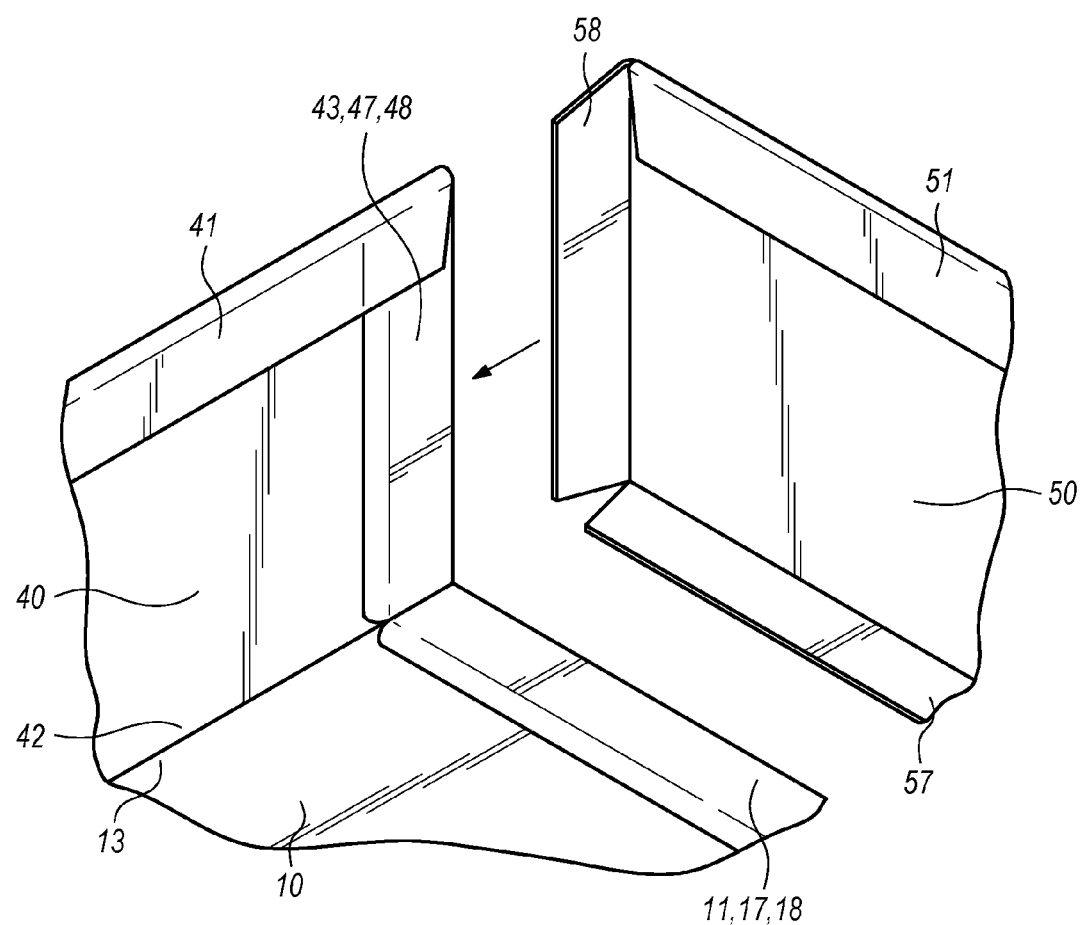
FIG. 11 is an enlarged view of the inside front right corner of appliance drain pan with removeably attachable side with the removeably attachable side removed and separated therefrom.

In order to use or install appliance drain pan with removeably attachable side 5, the removeably attachable side member 50 is first removed from appliance drain pan with removeably attachable side 5 by grasping removeably attachable side member 50 and pulling it away from appliance drain pan with removeably attachable side 5 to remove therefrom, as depicted in FIG. 3. Then, the appliance 100 is installed or placed onto the upper surface of bottom member 10 as depicted in FIG. 1. Next, the removeably attachable side member 50 is re-attached to appliance drain pan with removeably attachable side 5 by guiding tongue members 57, 58, and 59 into groove members 17, 47, and 27, respectively, and pressing removeably attachable side member 50 toward appliance drain pan with removeably attachable side 5 to seat tongue members 57, 58, and 59 within groove members 17, 47, and 27, respectively, to form a removeable press fit connection between these members, as depicted in FIG. 2.

What is claimed is:

1. An appliance drain pan with removeably attachable side comprising: a bottom member; a first side member; a second side member; a third side member; and a removeably attachable side member, wherein, said bottom member is a rigid quadrilateral planar member that is positioned horizontally, is impervious to liquids or fluids, and has an upper surface, a bottom surface, a front end, a rear end, a right end, and a left end, said first side member is a rigid quadrilateral planar member that is positioned vertically and parallel to said third side member, is impervious to liquids or fluids, and has an inside surface, an outside surface, a top end, a bottom end, a front end, and a rear end, said second side member is a rigid quadrilateral planar member that is positioned vertically and parallel with said removeably attachable side member when said removeably attachable side member is attached to said appliance drain pan with removeably attachable side, is impervious to liquids or fluids, and has an inside surface, an outside surface, a top end, a bottom end, a right end, and a left end, said third side member is a rigid quadrilateral planar member that is positioned vertically and parallel with said first side member, is impervious to liquids or fluids, and has an inside surface, an outside surface, a top end, a bottom end, a front end, and a rear end, said removeably attachable side member is a rigid quadrilateral planar member that is positioned vertically and parallel to said second side member when said removeably attachable side member is attached to said appliance drain pan with removeably attachable side, is impervious to liquids or fluids, and has an inside surface, an outside surface, a top end, a bottom end, a right end, and a left end, said bottom end of said first side member is rigidly attached to said left end of said bottom member with said first side member perpendicular to said bottom member where said rigid attachment is impervious to liquids or fluids, said bottom end of said second side member is rigidly attached to said rear end of said bottom member with said second side member perpendicular to said bottom member where said rigid attachment is impervious to liquids or fluids, said bottom end of said third side member is rigidly attached to said right end of said bottom member with said third side member perpendicular to said bottom where said rigid attachment is impervious to liquids or fluids, said rear end of said first side member is rigidly attached to said left end of said second side member where said rigid attachment is impervious to liquids or fluids, said rear end of said third side member is rigidly attached to said right end of said second side member where said rigid attachment is impervious to liquids or fluids, said bottom end of said removeably attachable side member is removeably attachable to said front end of said bottom member where said removable attachment is impervious to liquids or fluids, said right end of said removeably attachable side member is removeably attachable to said front end of said third member where said removable attachment is impervious to liquids or fluids, said left end of said removeably attachable side member is removeably attachable to said front end of said first member where said removable attachment is impervious to liquids or fluids, said removeably attachable side member further comprises: a bottom tongue member and a bottom groove member, wherein, said bottom tongue member is a rigid tab running along the entire said bottom end of said removeably attachable side member, said bottom tongue member is perpendicular to said inside surface of said removeably attachable side member, said bottom groove member is a semi-rigid seam running along the entire said front end of said bottom member on said upper surface thereof, said bottom groove member is parallel with said bottom member, and said bottom tongue member is in a removable press fit within said bottom groove member.

2. An appliance drain pan with removeably attachable side comprising: a bottom member; a first side member; a second side member; a third side member; and a removeably attachable side member, wherein, said bottom member is a rigid quadrilateral planar member that is positioned horizontally, is impervious to liquids or fluids, and has an upper surface, a bottom surface, a front end, a rear end, a right end, and a left end, said first side member is a rigid quadrilateral planar member that is positioned vertically and parallel to said third side member, is impervious to liquids or fluids, and has an inside surface, an outside surface, a top end, a bottom end, a front end, and a rear end, said second side member is a rigid quadrilateral planar member that is positioned vertically and parallel with said removeably attachable side member when said removeably attachable side member is attached to said appliance drain pan with removeably attachable side, is impervious to liquids or fluids, and has an inside surface, an outside surface, a top end, a bottom end, a right end, and a left end, said third side member is a rigid quadrilateral planar member that is positioned vertically and parallel with said first side member, is impervious to liquids or fluids, and has an inside surface, an outside surface, a top end, a bottom end, a front end, and a rear end, said removeably attachable side member is a rigid quadrilateral planar member that is positioned vertically and parallel to said second side member when said removeably attachable side member is attached to said appliance drain pan with removeably attachable side, is impervious to liquids or fluids, and has an inside surface, an outside surface, a top end, a bottom end, a right end, and a left end, said bottom end of said first side member is rigidly attached to said left end of said bottom member with said first side member perpendicular to said bottom member where said rigid attachment is impervious to liquids or fluids, said bottom end of said second side member is rigidly attached to said rear end of said bottom member with said second side member perpendicular to said bottom member where said rigid attachment is impervious to liquids or fluids, said bottom end of said third side member is rigidly attached to said right end of said bottom member with said third side member perpendicular to said bottom where said rigid attachment is impervious to liquids or fluids, said rear end of said first side member is rigidly attached to said left end of said second side member where said rigid attachment is impervious to liquids or fluids, said rear end of said third side member is rigidly attached to said right end of said second side member where said rigid attachment is impervious to liquids or fluids, said bottom end of said removeably attachable side member is removeably attachable to said front end of said bottom member where said removable attachment is impervious to liquids or fluids, said right end of said removeably attachable side member is removeably attachable to said front end of said third member where said removable attachment is impervious to liquids or fluids, said left end of said removeably attachable side member is removeably attachable to said front end of said first member where said removable attachment is impervious to liquids or fluids, said removeably attachable side member further comprises: a right tongue member and a right groove member, wherein, said right tongue member is a rigid tab running along the entire said right end of said removeably attachable side member, said right tongue member is perpendicular to said inside surface of said removeably attachable side member, said right groove member is a semi-rigid seam running along the entire said front end of said third member on said inner surface thereof, said right groove member is parallel with said third member, and said right tongue member is in a removable press fit within said bottom groove member.

3. An appliance drain pan with removeably attachable side comprising: a bottom member; a first side member; a second side member; a third side member; and a removeably attachable side member, wherein, said bottom member is a rigid quadrilateral planar member that is positioned horizontally, is impervious to liquids or fluids, and has an upper surface, a bottom surface, a front end, a rear end, a right end, and a left end, said first side member is a rigid quadrilateral planar member that is positioned vertically and parallel to said third side member, is impervious to liquids or fluids, and has an inside surface, an outside surface, a top end, a bottom end, a front end, and a rear end, said second side member is a rigid quadrilateral planar member that is positioned vertically and parallel with said removeably attachable side member when said removeably attachable side member is attached to said appliance drain pan with removeably attachable side, is impervious to liquids or fluids, and has an inside surface, an outside surface, a top end, a bottom end, a right end, and a left end, said third side member is a rigid quadrilateral planar member that is positioned vertically and parallel with said first side member, is impervious to liquids or fluids, and has an inside surface, an outside surface, a top end, a bottom end, a front end, and a rear end, said removeably attachable side member is a rigid quadrilateral planar member that is positioned vertically and parallel to said second side member when said removeably attachable side member is attached to said appliance drain pan with removeably attachable side, is impervious to liquids or fluids, and has an inside surface, an outside surface, a top end, a bottom end, a right end, and a left end, said bottom end of said first side member is rigidly attached to said left end of said bottom member with said first side member perpendicular to said bottom member where said rigid attachment is impervious to liquids or fluids, said bottom end of said second side member is rigidly attached to said rear end of said bottom member with said second side member perpendicular to said bottom member where said rigid attachment is impervious to liquids or fluids, said bottom end of said third side member is rigidly attached to said right end of said bottom member with said third side member perpendicular to said bottom where said rigid attachment is impervious to liquids or fluids, said rear end of said first side member is rigidly attached to said left end of said second side member where said rigid attachment is impervious to liquids or fluids, said rear end of said third side member is rigidly attached to said right end of said second side member where said rigid attachment is impervious to liquids or fluids, said bottom end of said removeably attachable side member is removeably attachable to said front end of said bottom member where said removable attachment is impervious to liquids or fluids, said right end of said removeably attachable side member is removeably attachable to said front end of said third member where said removable attachment is impervious to liquids or fluids, said left end of said removeably attachable side member is removeably attachable to said front end of said first member where said removable attachment is impervious to liquids or fluids, said removeably attachable side member further comprises: a left tongue member and a left groove member, wherein, said left tongue member is a rigid tab running along the entire said left end of said removeably attachable side member, said left tongue member is perpendicular to said inside surface of said removeably attachable side member, said left groove member is a semi-rigid seam running along the entire said front end of said first member on said inner surface thereof, said left groove member is parallel with said first member, and said left tongue member is in a removable press fit within said left groove member.

* * * * *